United States Patent
Ragland

[11] Patent Number: 5,845,805
[45] Date of Patent: Dec. 8, 1998

[54] BAKING PAN SYSTEM

[75] Inventor: G. William Ragland, Dunwoody, Ga.

[73] Assignee: ATD Corporation, St. Louis, Mo.

[21] Appl. No.: 4,601

[22] Filed: Jan. 8, 1998

[51] Int. Cl.⁶ .................................................. B65D 90/00
[52] U.S. Cl. ..................................... 220/573.3; 270/573.1; 270/737
[58] Field of Search ............................. 220/573.3, 573.4, 220/573.1, 574.3, 737, 23.86, 23.87

[56] References Cited

U.S. PATENT DOCUMENTS

| | | | |
|---|---|---|---|
| 391,524 | 10/1888 | Farrell | 220/573.1 |
| 1,296,423 | 3/1919 | Neef | 220/573.4 |
| 2,174,425 | 9/1939 | Schlumbohm | 220/573.1 |
| 2,323,356 | 7/1943 | Rosay | 220/737 X |
| 3,724,711 | 4/1973 | George et al. | 220/573.1 |
| 4,489,852 | 12/1984 | Logan et al. | 220/573.1 |
| 4,785,968 | 11/1988 | Logan et al. | 220/573.3 |
| 5,249,700 | 10/1993 | Dumke | 220/23.86 X |

*Primary Examiner*—Steven M. Pollard
*Attorney, Agent, or Firm*—Burns, Doane, Swecker & Mathis, LLP

[57] ABSTRACT

A baking system comprising a baking pan and a baking pan support wherein the support member is formed from a metal sheet or a stack of a plurality of metal sheets and is formed with an opening in the central portion of the support and the pan support member is formed to support the perimeter of the baking pan. The pan support member is formed so that it provides an air gap, insulation or shielding around the perimeter portion of baking pan. The baking system of this invention thereby provides full heat transfer in the central portion of the baking pan while insulating or shielding the perimeter portion of the baking pan thus resulting in more even baking. The baking system of this invention is particularly useful in pizza baking to prevent the burning or over baking of the pizza crust while providing sufficient baking for the center portion of the pizza.

13 Claims, 2 Drawing Sheets

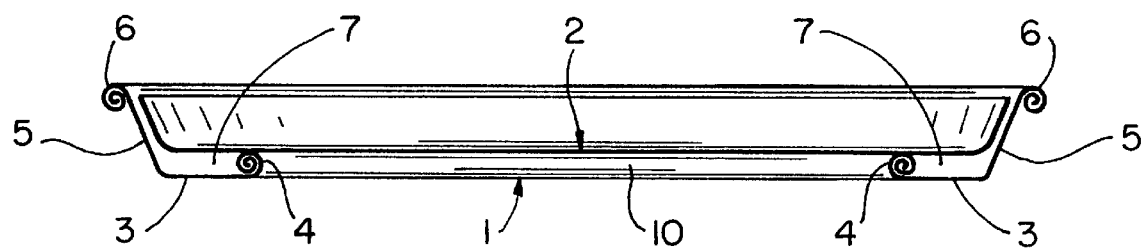
FIG_1
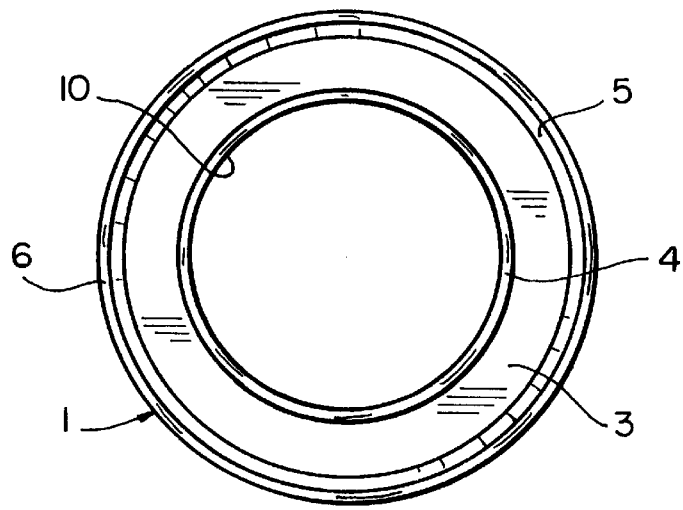
FIG_2
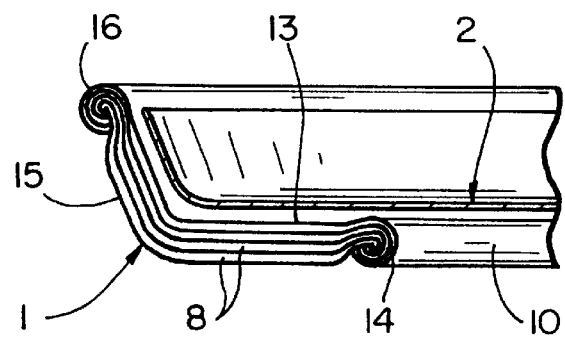
FIG_3

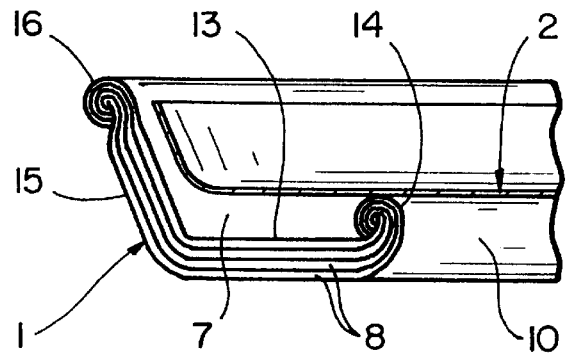
FIG_4
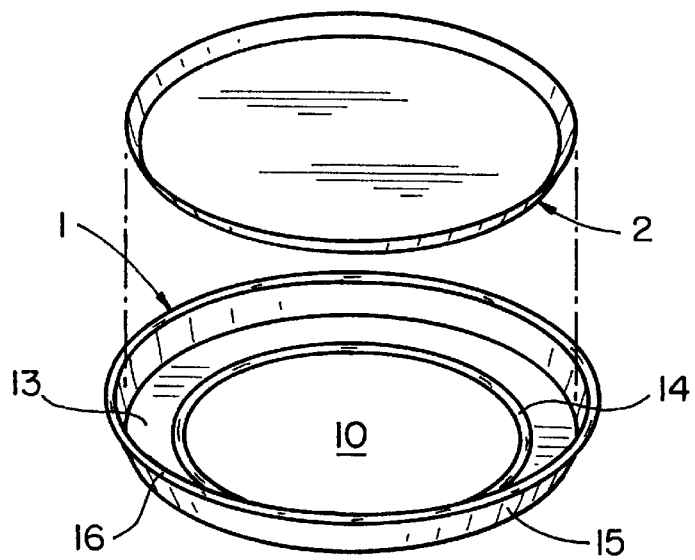
FIG_5
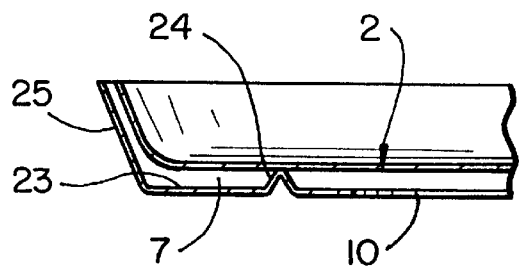
FIG_6

BAKING PAN SYSTEM

FIELD OF THE INVENTION

This invention relates to baking pans and in particular pans for baking pizza.

BACKGROUND OF THE INVENTION

Baking pans in general suffer from a problem wherein the food item baked in the baking pan frequently is baked too much or burns around the perimeter of the food item, while the center of the food item is not sufficiently cooked or is barely sufficiently cooked.

The problem particularly manifests itself in the cooking of pizza. The problem has become more manifest with the cooking of pizza resulting from the current trend of adding more toppings to the pizza, particularly fresh vegetable and fruit toppings having a high moisture content.

Double-walled cooking utensils have been known and used for some time to prevent burning of food items during cooking, for example the Logan et al. U.S. Pat. Nos. 4,489,852 and 4,595,120 are examples of such cooking utensils. For particular pizza baking utensils, attempts have previously been made to prevent the overcooking of the perimeter pizza crust while allowing the central portion of the pizza to sufficiently cook. For example, Barlow et al. in U.S. Pat. No. 4,563,946 disclose a pizza pan having perforations in the central portion of the pan to allow moisture to escape through the pan, thus allowing the central portion of the pizza to cook more quickly before the perimeter crust becomes overcooked. A similar pizza pan is also provided by Sebald in U.S. Pat. No. 5,503,063. The disclosures of the above patents are incorporated herein by reference.

The prior art devices do not satisfactorily solve the problem of uneven baking of food items, particularly pizza.

SUMMARY OF THE INVENTION

This invention provides a baking pan and pan support system which provides insulation or heat shielding around the perimeter portion of the baking pan while leaving the central portion of the baking pan exposed to full heat transfer. The system of this invention thus provides protection for the perimeter of the food item during baking to prevent the perimeter of the food item from becoming overcooked before the central portion of the food item is sufficiently cooked. While the baking pan and pan support system of this invention is applicable to any baking application it is particularly addressed and described herein in terms of baking pizza. Likewise, the system of this invention can be adapted to any desired shape of baking utensil, be it rectangular, square, round or oval. For purposes of this disclosure, the invention is illustrated by way of a round pizza baking pan.

In one aspect this invention provides a baking pan and pan support system comprising:
  a baking pan member having a surface for supporting a food item for baking; and
  a pan support member for supporting the baking pan member at the perimeter portion of the baking pan member wherein the pan support member comprises a plurality of metal sheets assembled in a stack and formed to provide a horizontal surface corresponding to the perimeter portion of the baking pan member; an opening in the central portion; a rolled edge around the opening wherein the edges of a plurality of the metal sheets are engaged together; a portion of the metal sheets extending upwardly from the outer portion of the horizontal surface; and
  a rolled edge around the upwardly extended edges of the metal sheets wherein the edges of a plurality of the upwardly extended metal sheets are engaged together.

In another aspect, this invention provides a baking pan support member comprising a metal sheet formed to provide means for supporting the baking pan at the perimeter portion of the baking pan comprising:
  a horizontal surface corresponding to the perimeter portion of the baking pan;
  an opening in the central portion of the pan support member adjacent the inner portion of the horizontal surface;
  a rolled edge around the opening;
  a portion of the metal sheet extending upwardly from the outer portion of the horizontal surface; and
  a rolled edge around the upwardly extended edge of the metal sheet.

In another aspect, this invention provides a method of baking a food item which comprises placing the food item to be baked on a baking pan supported by a support member comprising a metal sheet formed to provide means for supporting the baking pan at the perimeter portion of the baking pan comprising:
  a horizontal surface corresponding to the perimeter portion of the baking pan;
  an opening in the central portion of the support member;
  a rolled edge around the opening;
  a portion of the metal sheet extending upwardly from the outer portion of the horizontal surface; and
  a rolled edge around the upwardly extended edge of the metal sheet.

In another aspect this invention provides a method of making a baking pan support member comprising providing a metal sheet and forming the metal sheet to provide means for supporting the baking pan at the perimeter portion of the baking pan comprising:
  a horizontal surface corresponding to the perimeter portion of the baking pan;
  an opening in the central portion of the support member;
  a rolled edge around the opening;
  a portion of the metal sheet extending upwardly from the outer portion of the horizontal surface; and
  a rolled edge around the upwardly extended edge of the metal sheet.

In another aspect this invention provides a baking pan support member comprising a metal sheet formed to provide means for supporting the baking pan at the perimeter portion of the baking pan comprising:
  a horizontal surface corresponding to the perimeter portion of the baking pan;
  an opening in the central portion of the pan support member adjacent the inner portion of the horizontal surface; and
  a raised portion of the horizontal surface for supporting the baking pan and providing an air gap between the perimeter portion of the baking pan and the horizontal surface; and a portion of the metal sheet extending upwardly from the outer portion of the horizontal surface.

BRIEF DESCRIPTION OF THE DRAWINGS

FIG. 1 is a cross section view of the baking system of this invention comprising the baking pan and the pan support member.

FIG. 2 is a top view of the baking pan support member of this invention.

FIG. 3 is a cross section of a portion of the pan support member of this invention illustrating the pan support member made from multiple layers of metal sheet.

FIG. 4 is a cross section of a portion of the support member showing the optional position of the rolled edge in the multilayer metal sheet support.

FIG. 5 is a perspective view of the baking system of this invention.

FIG. 6 is a cross section of the pan support member without rolled edges.

DESCRIPTION OF THE INVENTION

The baking pan and pan support system comprising this invention can best be understood by reference to the drawings. As illustrated in FIGS. 1 and 2, pan support member (1) supports baking pan (2). Support member (1) is constructed of a metal sheet which has been cut out in the central portion to provide opening (10). The metal sheet is then formed to provide horizontal surface (3) which is rolled on the inside edge to provide roll (4). On the opposite edge of horizontal surface (3) the sheet is formed upward to form wall portion (5), which is also rolled at the top edge to provide roll (6). In this system the pan support member (1) supports baking pan (2) on the top of interior edge roll (4) and provides air gap (7) between the pan support member and the perimeter of the baking pan (2).

It will be recognized by one skilled in the art that it is desirable to use a metal sheet which has sufficient strength to withstand not only handling of the pan support member ring by itself but to also support baking pan (2) as well as support the load of the food item to be baked on baking pan (2). While interior edge roll (4) and top edge roll (6) are illustrated as rolls, it is to be recognized and is intended that the meaning of "rolled edge" in this invention includes not only circular rolls, but folds, crimps and the like which provide the function equivalent to rolling and reinforcing the edge portions of the metal sheet. As will be recognized by one skilled in the art, the forming of the metal sheet to provide pan support member (1) and rolling the exposed inner and top edges of the metal sheet significantly strengthens the pan support member (1). This enables one to use a thinner gauge metal and still obtain the desired strength characteristics of pan support member (1). If the edge portions are simply folded or crimped in a minimal fashion, the thickness or gauge of the metal sheet may need to be greater in order to provide the desired support strength for handling and for supporting baking pan (2). It has been found that relatively thin metal sheet can provide sufficient and desired strength in pan support member (1) when the metal sheet is formed by forming each of edge roll (4) and edge roll (6) in at least a 360° roll and by forming the upwardly extending wall portion (5) in a forming operation which essentially wrinkles and forms various types of corrugations in wall portion (5).

As referred to herein, the "horizontal surface" need not be exactly horizontal, but can be angled, shaped or other configuration which fulfills the function of providing support in some way for baking pan (2). Similarly, the width of the horizontal surface can vary depending on how much of the perimeter portion of the baking pan (2) is desired to be shielded or insulated by the air gap (7) or gaps (8).

In a preferred embodiment, pan support member (1) is constructed of a plurality of metal sheets, as illustrated in FIGS. 3 and 4. In this embodiment the multiple layers of metal sheets are formed in a stack, then opening (10) is cut from the stack to expose the inner edge which can then be rolled into inner edge roll (14). The stack of metal sheets is also formed to provide the upwardly inclined wall section (15) which also is rolled at the upper edge to form upper edge roll (16). As explained more fully below, the metal sheet layers that may be employed in this embodiment of this invention may include metal foils as the interior layers with heavier metal sheets as the exterior layers, or may be formed entirely of layers of metal foils. In the embodiment shown in FIG. 3, interior edge roll (14) forming the opening (10) can be positioned in line with the top surface of horizontal portion (13), whereby baking pan (2) is supported on the upper surface horizontal portion (13). In this embodiment, the air gaps (8) between the layers of the multilayer metal foil pan support member provide the perimeter insulation and shielding for the perimeter of baking pan (2).

FIG. 4 illustrates a similar embodiment of multilayer metal foil and metal sheet pan support member but with interior edge roll (14) forming opening (10) positioned in an upward direction whereby interior edge roll (14) provides the support for the perimeter of baking pan (2). In this embodiment, additional insulation and shielding for the perimeter of baking pan (2) is provided by air gap (7) as well as the air gaps (8) existing between the layers of metal sheets in pan support member.

FIG. 5 is a perspective view illustrating the placement of baking pan (2) in the interior portion of support member (1) wherein the baking pan (2) is supported by the interior edge roll (4) forming the central opening (10), as shown in FIG. 1. It is preferred that the baking pan (2) be of sufficient size to fit closely to, but not necessarily in contact with, the upwardly extending wall portion (5) in order to provide a relatively closed chamber forming air gap (7) and to increase the efficiency of the heat insulation and shielding for the perimeter portion of baking pan (2).

FIG. 6 illustrates another embodiment of the present invention wherein the pan support member is constructed of a metal sheet of sufficient strength that the edge rolls are not needed or desired for structural strength. In this embodiment the metal sheet is formed to provide a horizontal surface (23) and upwardly extending wall section (25) with a protrusion (24) positioned between wall section (25) and opening (10) for supporting baking pan (2). In this embodiment the support protrusion (24) supports baking pan (2) to provide air gap (7) between the pan support member and the baking pan, thus providing the insulation and heat shielding of the perimeter portion of the baking pan (2). It will be apparent to one skilled in the art that various configurations of a support protrusion or member (24) can be fashioned in the horizontal portion (23) or even in the wall portion (25) to suspend the baking pan (2) to form air gap (7) while leaving opening (10) in the central portion of the pan support member.

The baking pan (2) which can be employed in the baking system of this invention can be any conventional metal, glass, ceramic or other baking pan or dish appropriate for the system in use and the food to be baked. For example, conventional pizza baking pan or sheet can be used or a double layer baking pan such as disclosed in the Logan et al. patents referred to above can be used. More preferably for pizza baking a perforated pizza pan, such as disclosed in Barlow et al. or Sebald patents referred to above, can be employed. In another preferred embodiment of this invention, the baking pan (2) can comprise an expanded metal sheet or metal mesh having a plurality of openings in the mesh or expanded metal sheet to allow maximum heat transfer and moisture transmission in desired central portions of the pizza.

The pan support member according to the present invention can be formed with the inner edge roll (4) and upper edge roll (6) using conventional metal sheet forming processes. For example, the forming of multilayer metal sheet structures and in particular, multilayer metal foil structures is disclosed in copending application Ser. No. 08/871,275, filed Jun. 9, 1997, the disclosure which is incorporated herein by reference. In addition it will be apparent to one skilled in the art that the pan support member of this invention can be formed using various configurations of multilayer metal sheet and multilayer metal foil structures including those corrugated structures as disclosed in copending application Ser. No. 08/871,771 filed Jun. 9, 1997, the disclosure of which is incorporated herein by reference. In addition it will be apparent that baking pan (2) can likewise be fabricated from the various multilayer metal sheet and multilayer metal foil structures disclosed in these two copending applications.

The pan support member of this invention and the baking pan usable in this system of this invention can be formed and shaped from any desired metal sheet or metal plate to provide the desired structural strength for a particular baking application. In some preferred embodiments of this invention that the pan support member can be constructed from a multilayer metal sheet structure comprising upper and lower metal sheets of 10 mils (0.010 inches) in thickness with two interior metal foil layers of 2 mil thickness (0.002 inches). In some applications it will be preferred that the upper and lower layers as well as the interior layers be metal foil such as a 5/2/5 (in mils) stack of metal foils. In such structures the rolled edges are particularly important for providing sufficient structural strength. Various combinations of such layers of metal sheets or metal foils will be apparent to one skilled in the art. For example, various combinations of such multilayer metal sheet and metal foil structures are disclosed in copending applications Ser. No. 60/042,992 filed Apr. 10, 1997, and Ser. No. 08/____ (Attorney docket No. 002004-152) filed Dec. 31, 1997, the disclosures of which are incorporated herein by reference.

I claim:

1. A baking pan and pan support system comprising:
   a baking pan member having a surface for supporting a food item for baking; and
   a pan support member for supporting the baking pan member at the perimeter portion of the baking pan member wherein the pan support member comprises a plurality of metal sheets assembled in a stack and formed to provide:
      a horizontal surface corresponding to the perimeter portion of the baking pan member,
      an opening in the central portion;
      a rolled edge around the opening wherein the edges of a plurality of the metal sheets are engaged together;
      a portion of the metal sheets extending upwardly from the outer portion of the horizontal surface; and
      a rolled edge around the upwardly extended edges of the metal sheets wherein the edges of a plurality of the upwardly extended metal sheets are engaged together.

2. A baking pan system according to claim 1 wherein at least one of the metal sheets is a metal foil.

3. A baking pan system according to claim 1 wherein the rolled edge around the opening extends upwardly from the horizontal surface and the rolled edge provides support for the baking member.

4. A baking pan system according to claim 1 wherein the rolled edge around the opening extends no higher than the horizontal surface and the horizontal surface provides support for the baking member.

5. A baking pan system according to claim 1 wherein at least one of the metal sheets is separated from another metal sheet to provide gaps therebetween in a portion of the horizontal surface area or in a portion of the upwardly extending area.

6. A baking pan support member comprising a metal sheet formed to provide means for supporting a baking pan at the perimeter portion of the baking pan comprising:
   a horizontal surface corresponding to the perimeter portion of the baking pan;
   an opening in the central portion of the pan support member adjacent the inner portion of the horizontal surface;
   a rolled edge around the opening;
   a portion of the metal sheet extending upwardly from the outer portion of the horizontal surface; and
   a rolled edge around the upwardly extended edge of the metal sheet.

7. A baking pan support member according to claim 6 wherein the rolled edge around the opening extends upwardly from the horizontal surface and provides support for the baking pan.

8. A baking pan support member according to claim 6 wherein the rolled edge around the opening extends no higher than the horizontal surface and the horizontal surface provides support for the baking pan.

9. A baking pan support member according to claim 6 comprising a plurality of metal sheets formed and edge rolled to provide the support member.

10. The baking pan support member according to claim 9 wherein at least one of the metal sheets is a metal foil.

11. A method of baking a food item which comprises placing the food item to be baked on a baking pan supported by a support member comprising a metal sheet formed to provide means for supporting the baking pan at the perimeter portion of the baking pan comprising:
   a horizontal surface corresponding to the perimeter portion of the baking pan;
   an opening in the central portion of the support member;
   a rolled edge around the opening;
   a portion of the metal sheet extending upwardly from the outer portion of the horizontal surface;
   and a rolled edge around the upwardly extended edge of the metal sheet.

12. A method of making a baking pan support member comprising providing a metal sheet and forming the metal sheet to provide means for supporting the baking pan at the perimeter portion of the baking pan comprising:
   a horizontal surface corresponding to the perimeter portion of the baking pan;
   an opening in the central portion of the support member;
   a rolled edge around the opening;
   a portion of the metal sheet extending upwardly from the outer portion of the horizontal surface; and
   a rolled edge around the upwardly extended edge of the metal sheet.

13. A baking pan support member comprising a metal sheet formed to provide means for supporting the baking pan at the perimeter portion of the baking pan comprising:
   a horizontal surface corresponding to the perimeter portion of the baking pan;

an opening in the central portion of the pan support member adjacent the inner portion of the horizontal surface; and a raised portion of the horizontal surface for supporting the baking pan and providing an air gap between the perimeter portion of the baking pan and the horizontal surface; and a portion of the metal sheet extending upwardly from the outer portion of the horizontal surface.

* * * * *